United States Patent
Mashak et al.

(10) Patent No.: US 10,934,970 B2
(45) Date of Patent: Mar. 2, 2021

(54) CRANKSHAFT SEAL

(71) Applicant: Caterpillar Inc., Deerfield, IL (US)

(72) Inventors: John M. Mashak, Peoria, IL (US); Keith Harmeyer, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 16/126,298

(22) Filed: Sep. 10, 2018

(65) Prior Publication Data

US 2020/0080510 A1    Mar. 12, 2020

(51) Int. Cl.
*F16J 15/3232*    (2016.01)
*F02F 11/00*    (2006.01)

(52) U.S. Cl.
CPC ......... *F02F 11/007* (2013.01); *F16J 15/3232* (2013.01)

(58) Field of Classification Search
CPC ...... F16J 15/32; F16J 15/3204; F16J 15/3216; F16J 15/3232; F16J 15/3248; F16J 15/3268; F02F 11/007
See application file for complete search history.

(56) References Cited

U.S. PATENT DOCUMENTS

| 4,906,009 | A |  | 3/1990 | Saitoh |
|---|---|---|---|---|
| 5,975,534 | A | * | 11/1999 | Tajima ................ F16J 15/3264 277/353 |
| 2005/0194462 | A1 |  | 9/2005 | Coldren et al. |
| 2009/0108539 | A1 | * | 4/2009 | Forti ................... F16C 33/7879 277/553 |
| 2010/0096473 | A1 |  | 4/2010 | Coldren et al. |
| 2016/0039246 | A1 | * | 2/2016 | Brunetti .............. F16C 33/7823 277/551 |
| 2018/0347702 | A1 | * | 12/2018 | Sakano ................ F16J 15/3232 |
| 2020/0011423 | A1 | * | 1/2020 | Ito ........................ F16J 15/3264 |

FOREIGN PATENT DOCUMENTS

| CN | 200940684 Y | 8/2007 |
|---|---|---|
| CN | 205503990 U | 8/2016 |
| EP | 1586799 | 10/2005 |
| EP | 2 749 796 A1 | 7/2014 |
| EP | 3156699 | 4/2017 |
| JP | H08189442 A | 4/1995 |
| WO | 2018/097268 A1 | 5/2018 |

OTHER PUBLICATIONS

Search Report relating to GB 1906738.8, dated Nov. 11, 2019.

* cited by examiner

*Primary Examiner* — Gilbert Y Lee
(74) *Attorney, Agent, or Firm* — Bookoff McAndrews

(57) ABSTRACT

A sealing device may comprise: a flange that extends perpendicularly relative to a central axis of first portion; an inner cylindrical portion having an engaging surface, and a protruding portion extending between the flange and the inner cylindrical portion; a rigid body component; and an elastic component having a main oil lip and an excluder lip, wherein the main oil lip is proximate to or in contact with the flange at a first location, and wherein a the excluder lip contacts the inner cylindrical portion; wherein a gap is defined by surfaces of the first portion and the elastic component between the first location and the second location, and wherein, when the sealing device is installed in a bore so that the engaging surface is fixedly connected to the shaft and a machine is operated so that the shaft rotates, the volume of the gap changes by less than 10%.

20 Claims, 3 Drawing Sheets

CRANKSHAFT SEAL

TECHNICAL FIELD

The present disclosure relates generally to a seal and, more particularly, to a seal for use with a rotating shaft such as a crankshaft.

BACKGROUND

Seals may be used alongside various components of engines to prevent ingress or egress of fluids such as oil. For example, seals may be used to provide a seal between a shaft such as a crankshaft and an opening into which the shaft is inserted. Obtaining the proper seal is vital to the short and long-term performance of an engine. When positioned in a bore of an engine, movement of a shaft and/or housing of the engine may cause expansion and contraction of spaces internal to the seal. Expansion of certain spaces within the seal may compromise the sealing abilities of the seal, due to formation of undesired pressures within the seal.

PCT Publication No. WO 2018097268, filed by Nok Corp., and published May 31, 2018, describes a seal for use with a crankshaft of a machine. However, in practice, the seal described therein fails to provide adequate sealing of engine oil in an engine. Instead, oil may leak through a sealing lip of the disclosed apparatus. Movement of components of a crankshaft and/or housing with which the disclosed seal are used cause creation of a negative pressure within the seal, causing leaking of oil. The system of the present disclosure may solve one or more of the problems set forth above and/or other problems in the art. The scope of the current disclosure, however, is defined by the attached claims, and not by the ability to solve any specific problem.

SUMMARY

In one aspect, sealing device may comprise an annular first portion including: a flange that extends perpendicularly relative to a central axis of first portion; an inner cylindrical portion having an engaging surface, wherein the engaging surface is configured to be fixedly connected to a rotatable shaft of a machine; and a protruding portion extending between the flange and the inner cylindrical portion; and an annular second portion including: a rigid body component; and an elastic component having a main oil lip and an excluder lip, wherein the main oil lip is proximate to or in contact with the flange at a first location, and wherein a the excluder lip contacts the inner cylindrical portion; wherein a gap is defined by surfaces of the first portion and the elastic component between the first location and the second location, and wherein, when the sealing device is installed in a bore so that the engaging surface is fixedly connected to the shaft and the machine is operated so that the shaft rotates, the volume of the gap changes by less than or equal to 10%.

In another aspect, a sealing device may comprise an annular first portion including: a flange that extends perpendicularly relative to a central axis of first portion; and a protruding portion, wherein the protruding portion has an axially inner wall that extends perpendicularly relative to the central axis of first portion; and a radially inner cylindrical portion having an engaging surface, wherein the engaging surface is configured to be fixedly connected to a rotatable shaft of a machine; and an annular second portion including: a rigid body component, wherein the rigid body component has an axially outer wall that extends perpendicularly relative to the central axis of the second portion; and an elastic component having a main oil lip and an excluder lip, wherein the main oil lip is proximate to or in contact with the flange at a first location, and wherein a the excluder lip contacts the inner cylindrical portion at a second location; and wherein the flange is one-third to one-half of the way between the protruding portion axially inner wall and the rigid body component axially outer wall.

In yet another aspect, a sealing device may comprise: an annular first portion including: a flange that extends perpendicularly relative to a central axis of first portion; an inner cylindrical portion having an engaging surface, wherein the engaging surface is configured to be fixedly connected to a rotatable shaft of a machine; and a protruding portion, wherein the protruding portion has an axially inner wall that extends perpendicularly relative to the central axis of first portion and two parallel walls extending parallel to a central axis of the first portion; and an annular second portion including: a rigid body component; and an elastic component having a main oil lip and an excluder lip, wherein the main oil lip is proximate to or in contact with the flange at a first location, and wherein a the excluder lip contacts the inner cylindrical portion at a second location; wherein dimensions of the protruding portion are sufficiently large so that, when the sealing device is installed in a bore so that the engaging surface is fixedly connected to the shaft and the machine is operated so that the shaft rotates, oil does not intrude into the sealing device past the main oil lip.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," substantially," and "approximately" are used to indicate a possible variation of ±10% in the stated value. While the below disclosure makes reference to a crankshaft, it will be appreciated that the sealing device described herein may also be used with any other type of rotating shaft of an engine or another part of a machine.

Figure 1A:
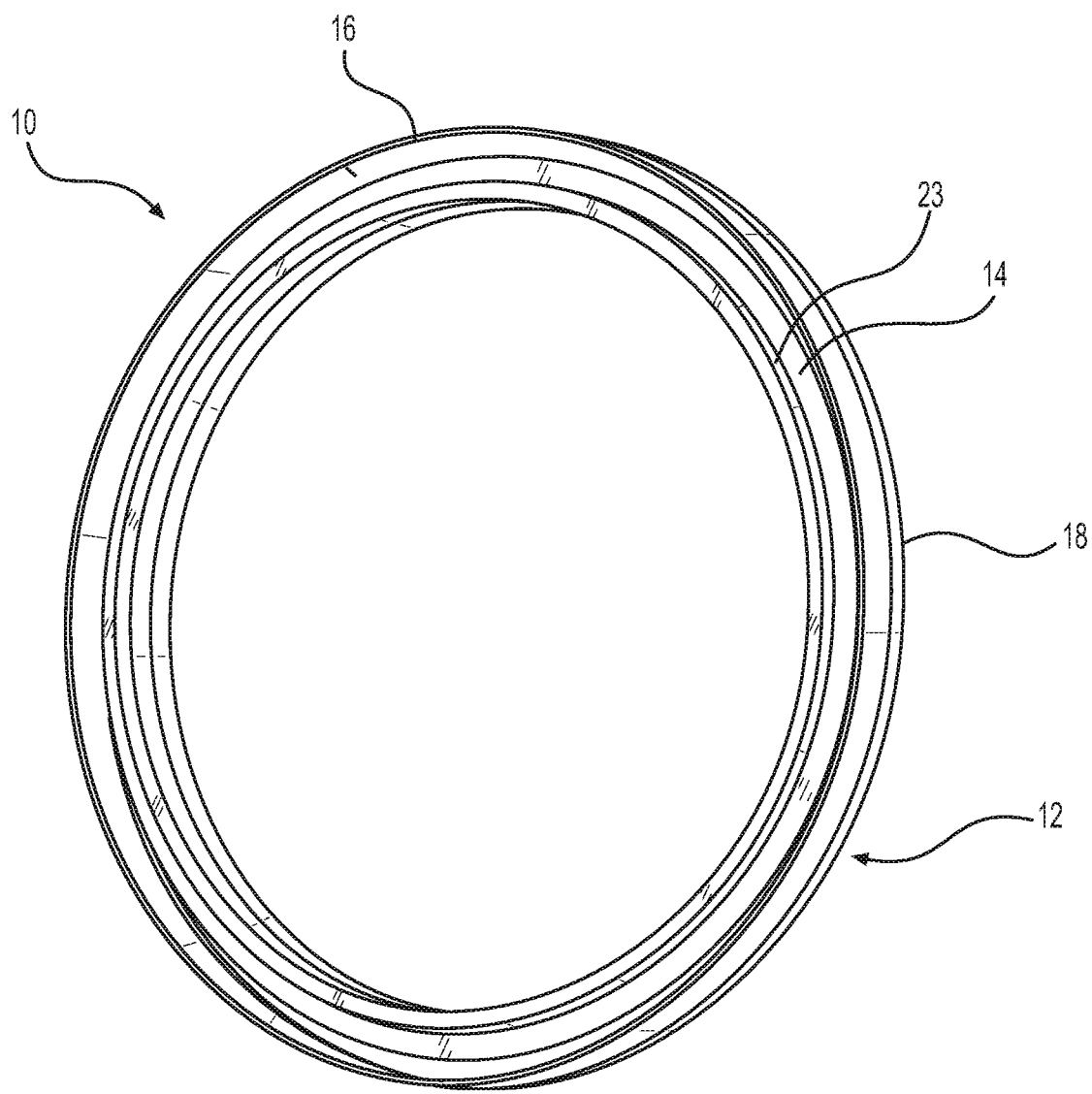
FIG. 1A-1B depict an exemplary first sealing device.
Figure 1B:
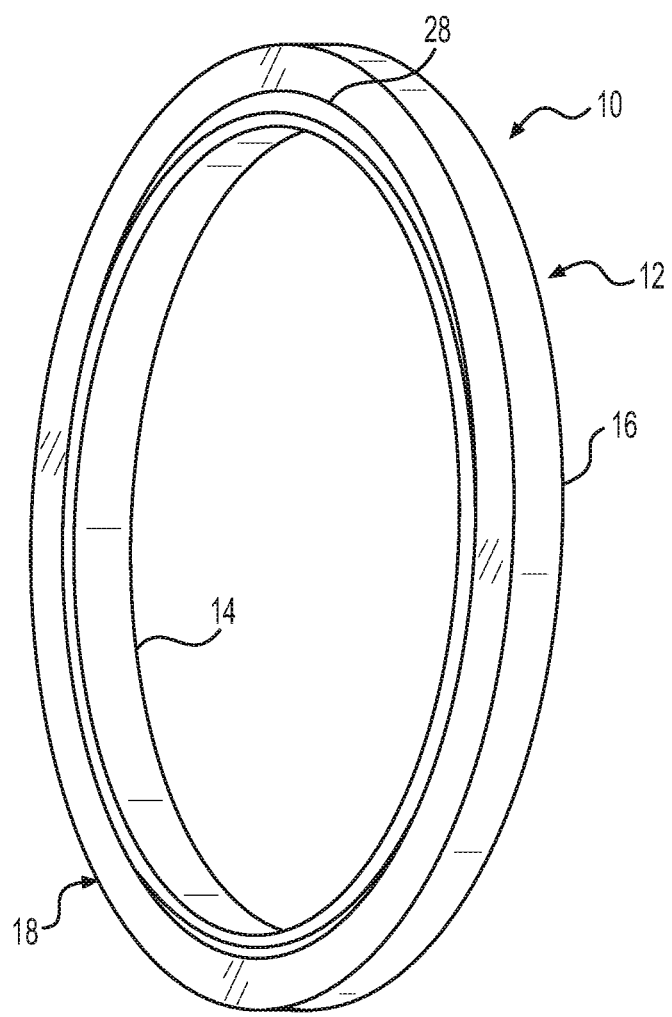

FIGS. 1A-1B depict an exemplary sealing device 10 for use with a crankshaft or other rotating component. Sealing device 10 may be, for example, a lay-down elastomeric crankshaft seal. Sealing device 10 may fit in between a rotatable component such as a crankshaft and between a stationary portion such as a housing. For example, sealing device 10 may fit in a bore of a machine. The bore may be a space in between a shaft (such as a crankshaft) and a housing. Sealing device 10 may include a stationary component 12. Stationary component 12 may have an annular shape and may remain stationary with respect to a housing and/or a bore of a machine in which sealing device 10 is installed. Sealing device 10 may also include a sleeve 14. Sleeve 14 may be annularly shaped and may rotate along with a rotatable component such as a shaft. Sleeve 14 may rotate relative to stationary component 12 and a bore and/or housing in which sealing device 10 is installed. Sleeve 14 may be comprised of metal such as, for example, stamped steel (e.g., stainless steel or cold rolled steel). Sleeve 14 may rotate because it is fixed to a rotatable component such as a shaft (e.g., a crankshaft) such as via, for example, an interference or friction fit between sleeve 14 and a crankshaft.

Stationary component 12 may include a seal body 16, which may be a rigid component or body. Seal body 16 may be annular and may be comprised of metal such as, for example, stamped steel (e.g. stainless steel or cold-rolled steel). Stationary component 12 may also include an elastic component 18. Elastic component 18 may be overmolded on seal body 16 or otherwise attached to seal body 16. Elastic component 18 may also be annular and may be comprised of any suitable flexible material. For example, elastic component 18 may be comprised of an elastomer such as a fluorocarbon material (FKM). Portions of elastic component 18 may be comprised of different materials. For example, portions of elastic component 18 may comprise Nomex or another material having low permeability, while other portions of elastic component 18 may comprise FKM. Portions of elastic component 18 having a low permeability may not allow any air or liquid or may not allow a substantial amount of air or liquid to pass through the material.

While the discussion herein describes a sealing device 10 having an elastic component 18 included on stationary component 12, elastic component 18 could instead be included with sleeve 14 and may be movable (e.g., rotatable) relative to stationary component 12.

Figure 2:
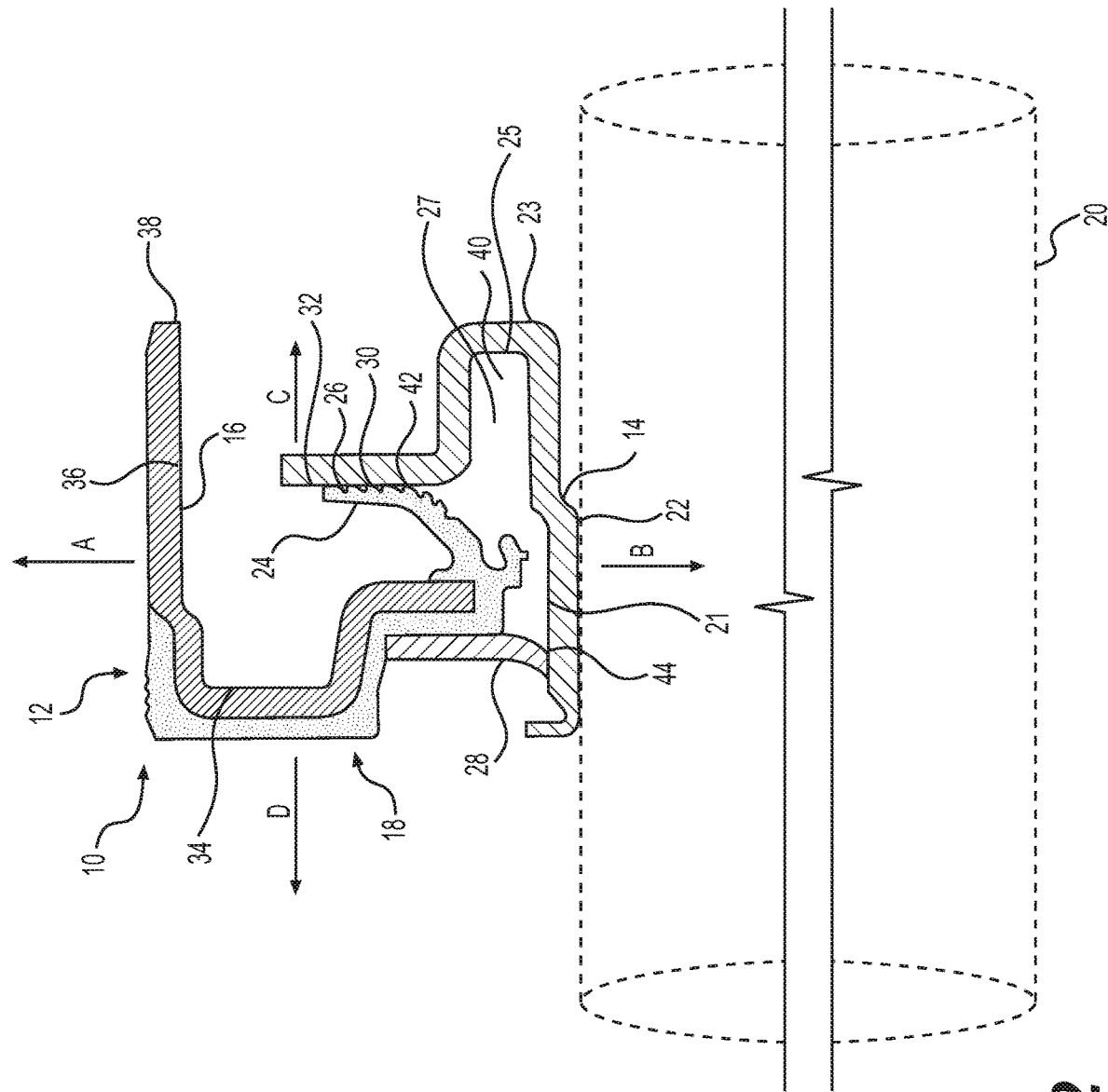
FIG. 2 depicts a cross-section of an exemplary sealing device.

FIG. 2 shows a cross section of sealing device 10. Sealing device 10 is shown positioned relative to a shaft 20. Direction A, as shown in FIG. 2, may designate a radially outward direction, relative to a central axis of sealing device 10 and/or shaft 20. Direction B may designate a radially inward direction, relative to a central axis of sealing device 10 and/or shaft 20. Direction C may designate an axially inward direction, toward an oil side of sealing device 10. Direction D may designate an axially outward direction, toward an air side or a transmission oil side. Shaft 20 may be, for example, a crankshaft. FIGS. 3A and 3B show cut-away perspective views of sealing device 10.

As shown in FIGS. 1A, 1B, and 2, sleeve 14 may include a cylindrical portion 21. Cylindrical portion 21 may be located on a radially inward side (toward direction B) of sleeve 14. In cross-section, cylindrical portion 21 may have a substantially linear sides. Cylindrical portion 21 may form an inner cylindrical surface of annular sleeve 14, as shown in FIGS. 1A-1B. Cylindrical portion 21 may have a radially inward surface 22. When sleeve 14 is positioned around a shaft 20, radially inward surface 22 may abut a surface of shaft 20. Sleeve 14 may be fixedly connected to a surface of shaft 20 by any suitable mechanism. For example, sleeve 14 may be fixedly connected to a surface of shaft 20 via, for example, an interference fit between inward surface 22 and shaft 20. Additionally or alternatively, sleeve 14 may be fixedly connected to a surface of shaft 20 via other mechanisms, including one or more of a friction/interference fit, adhesive, rivets, or other mechanical fasteners. When shaft 20 rotates in operation, inward surface 22 and thus sleeve 14 may remain fixed relative to shaft 20, and sleeve 14 may rotate along with shaft 20. Sleeve 14 may also include a flange 32. Flange 32 may extend in a radial direction, along directions A and/or B. Flange 32 may be disposed substantially perpendicular to a central axis of shaft 20. Sleeve 14 may also include a protruding portion 23. Protruding portion 23 may extend between cylindrical portion 21 and flange 32. Protruding portion 23 may form a bulge in a wall of sleeve 14. For example, protruding portion 23 may bulge in a generally axially inward direction (direction C), toward an oil side of sealing device 10. Alternatively or additionally, protruding portion 23 may bulge in another direction. As shown in FIG. 2, protruding portion 23 has three sides and forms an rectangular-type shape with one open side. Protruding portion 23 may have two parallel walls which run in an axial direction (along directions C and/or D). Protruding portion 23 may alternatively have any suitable shape and/or size. Protruding portion 23 may extend substantially toward an oil side of sealing device 10, in an axially inward direction (direction C). In cross-section, a most axially inner wall 25 (in direction C) of protruding portion 23 may extend in an approximately parallel direction to flange 32, in a radial direction (along directions A and/or B). Axially inner wall 25 may be perpendicular to a central axis of sealing device 10 and/or sleeve 14, like flange 32. Protruding portion axially inner wall 25 may be further axially inward (in direction C) than flange 32. An axial length (along directions C/D) of protruding portion may be approximately the same as an axial length (along directions C/D) of cylindrical portion 21.

Protruding portion 23 may define an interior region 27. Interior region 27 may be defined on three sides by walls of protruding portion 23, which may have the configuration described above. Interior region 27 may be defined on a fourth side by a line extending from an axially outer (in a direction D) edge of the two parallel walls of protruding portion 23, parallel to axially inner wall 25. Interior region 27 may be radially inward (in direction B) of flange 32 and axially inward (in direction C) of inward surface 22.

Elastic component 18 may include a main oil lip 24. Main oil lip 24 may extend radially outward and axially inward (in directions A and C), as shown in FIG. 2. Main oil lip 24 may include one or more grooves 26, which may assist in pumping oil or other fluids. Grooves 26 may have any suitable configuration, such as configurations already known in the art. A longitudinal surface 30 of main oil lip may extend in a substantially radially outward direction (along direction A). Main oil lip 24 may abut or be proximate to flange 32 of sleeve 14. Alternatively, as described above, main oil lip 24 may be included on sleeve 14, along with some or all of the other elements of elastic component 18. In such a case, main oil lip 24 may abut or be proximate to a portion of stationary component 12.

Elastic component 18 may also include an excluder lip 28. Excluder lip 28 may be formed of a material such as Nomex. Excluder lip 28 may serve to keep contaminants such as dust away from the oil side of sealing device 10. Excluder lip 28 may abut a surface of cylindrical portion 21 so that there is no space between a surface of excluder lip 28 and a surface of cylindrical portion 21. In one embodiment, contact between an impermeable excluder lip 28 and a surface of cylindrical portion 21 may substantially prevent ingress of dust and/or other contaminants axially inward (in direction C) of excluder lip 28. Such an embodiment may provide protection from dust and other contaminants. In other embodiments, excluder lip 28 may not make contact with a surface of cylindrical portion 21 and/or may be made of a material which is permeable to air flow (e.g., felt). Such embodiments may provide less protection against dust and/or other contaminants but may have other advantages.

Seal body 16 may include an axially outer wall 34. A seal body axially outer wall 34 may be the most axially outward portion (in direction D) of sealing device 10. In cross section, seal body axially outer wall 34 may extend in an approximately parallel direction to flange 32 and sleeve axially inner wall 25, along directions A and/or B. Like flange 32, axially outer wall 34 may extend perpendicularly to a central axis of sealing device 10 and/or seal stationary component 12. Seal body 16 may also include a radially outer wall 36 (in direction A), which may form the radially outermost portion of sealing device 10. In cross-section, seal body radially outer wall 36 may be approximately parallel to cylindrical portion 21 and may extend along directions C and/or D. An axially inner edge 38 of seal body radially outer wall 36 may extend approximately as far axially inward (in direction C) as protruding portion axially inner wall 25 so that axially inner edge 38 is approximately aligned with protruding portion axially inner wall 25. Alternatively, axially inner edge 38 may extend past protruding portion axially inner wall 25, or protruding portion axially inner wall 25 may extend past axially inner edge 38. Alternatively, axially inner edge 38 may approximately align with flange 32.

Flange 32 may be in between (a) seal body axially outer wall 34 and (b) protruding portion axially inner wall 25 and/or axially inner edge 38. Flange 32 may be in a middle or central portion of sealing device 10, in an axial direction (along directions C/D). Main oil lip 24 may also be in a middle or central portion of sealing device 10, in an axial direction. If sealing device 10 were divided into thirds along an axial direction, flange 32 may fall within the middle third of an axial length of sealing device 10 and/or a middle third of radially outward surface 16. Flange 32 may be somewhat closer to protruding portion axially inner wall 25 and/or axially inner edge 38 than seal body axially outer wall 34. For example, flange 32 may be between one-third and one-half way between protruding portion axially inner wall 25 and seal body axially outer wall 34, closer to protruding portion axially inner wall 25. An axially outward (in direction D) edge of flange may approximately line up with an axially inward edge (along direction C) of cylindrical portion 21.

A gap (or volume) 40 exists between elastic component 18 and sleeve 14, as shown in FIG. 2. Gap 40 may be formed between (a) a location 42, where main oil lip 24 contacts or is proximate to flange 32 of sleeve 14 and (b) a location 44 where excluder lip 28 contacts sleeve 14. A surface of protruding portion 23 may define a portion of gap 40. Protruding portion 23 may define a majority of gap 40. In operation, a thin layer of oil may form between longitudinal surface 30 of main oil lip 24 and flange 32 of sleeve 14. Therefore, oil lip 24 may not directly contact a surface of flange 32 of sleeve 14. When oil lip 24 is working to prevent egress of oil from an oil side of sealing device 10 (and thus is not in direct contact with flange 32), gap 40 may be defined as a space between (a) the oil film between main oil lip 24 and sleeve 14 and (b) excluder lip 28.

The size of gap 40 may be critical to the functioning of sealing device 10. When a sealing device 10 is used in a machine, components of the sealing device 10 may move relative to one another in axial or radial directions. For example, sleeve 14 may move relative to stationary component 12. Such movement may be in a primarily axial direction. Movement of the parts of sealing device 10 to one another may cause a change in volume of gap 40. For example, axial relative movement between sleeve 14 and stationary component 12 may cause a volume of gap 40 to alternatively expand and contract. For example, components of sealing device 10 may move approximately 3 mm (or any other value, depending upon characteristics of the machine in which sealing device 10 is installed) in either of directions C and/or D (axially inward and outward). As components of sealing device 10 move away from one another, the volume of gap 40 may increase.

The volume of gap 40 when sealing device 10 is not in use may be referred to herein as the nominal volume of gap 40. For given nominal volumes of a gap 40, a given change in volume may have different effects on the sealing capabilities of sealing device 10. If a change in volume, "x," occurs with respect to gap 40, then a change in volume of gap 40 may be expressed as a percentage by dividing x by the nominal volume, v, of gap 40 and multiplying by 100%. If the same change in volume, "x" were to occur with respect to (1) a sealing device 10 with a gap 40 with a smaller nominal volume and (2) a sealing device 10 with a gap 40 with a larger nominal volume, the percentage change in volume would be larger with respect to the sealing device 10 with the smaller gap 40. In other words, the change in volume (x) would be larger relative to the nominal volume of a smaller gap 40 than a larger gap 40.

Changes in volume may cause a decrease in pressure in gap 40 where the change in volume of gap 40 is large relative to the nominal volume of gap 40. Where a seal has an excluder lip 28 that contacts sleeve 14 and does not allow inflow or outflow of air, decreases in pressure may be of particular concern. Where a nominal volume of gap 40 is relatively small, such a decrease in pressure may cause oil to ingress into sealing device 10, past main oil lip 24. Thus, a decrease in pressure in a relatively small gap 40 may undermine the performance of sealing device 10. In contrast, where sealing device 10 has a relatively large volume in gap 40, changes in volume of gap 40 may not cause a decrease in pressure that is large enough to compromise a seal formed by main oil lip 24. Thus, a sealing device 10 with a relatively larger gap 40 may perform better in the short and long run. Changes in pressure may be at least in part due to a low permeability of an excluder lip 28. For example, an excluder lip 28 with a low permeability may not allow sufficient passage of air so as to prevent or abate a change in pressure due to a change in volume.

For example, in operation in a particular machine, portions of sealing devices 10a or 10b may move up to 3 mm in one direction or another. This movement may cause an increase in volume in gap 40 or in gap 40b of amounts approximately 1800 (e.g., 1820) cubic millimeters for that machine. For a configuration of a particular sealing device, a certain amount of change in volume (expressed as a percent) may be tolerable before the effectiveness of the sealing device is affected. For example, for sealing device 10, a change in volume of gap 40 of up to approximately 10%, more preferably up to approximately 9.75%, or even more preferably up to approximately 9% may be tolerable before the effectiveness of sealing device 10 is compromised. Alternatively, a change in volume of gap 40 of up to 8% may be tolerable.

A volume of interior region 27 may be at least approximately 15650 cubic millimeters (e.g., at least 15652 cubic millimeters), more preferably at least approximately 16585 cubic millimeters (e.g., at least 16589 cubic millimeters), or even more preferably at least 19710 cubic millimeters (e.g., at least 19715.3 cubic millimeters). Alternatively, a volume of interior region 27 may be at least approximately 24790 cubic millimeters (e.g., at least 24794 cubic millimeters).

Given the change in volume that may be anticipated, gap 40 may have a volume of at least 36570 cubic millimeters in order to avoid effects of a decrease in pressure in gap 40 and ineffectiveness of sealing device 10. For example, a gap may have a volume of at least 37500 cubic millimeters, more preferably at least 37508 cubic millimeters, more preferably at least 40600 cubic millimeters, more preferably at least 40630 cubic millimeters, or even more preferably at least 40633 cubic millimeters. Alternatively, gap 40 may have a volume of at least 45700 cubic millimeters or at least 45712 cubic millimeters. Alternatively a gap may have a volume between 36570 cubic millimeters and 45720 cubic millimeters, more preferably between 36571 cubic millimeters and 45712 cubic millimeters, more preferably between 36570 (or 36571) cubic millimeters and 40635 (or 40633) cubic millimeters, and even more preferably between 37510 (or 37508) cubic millimeters and 40630 (or 40633) cubic millimeters. Where a sealing device 10 has a gap 40 that is lower in volume than the critical value, the sealing device 10 will not sufficiently keep oil from leaking out of an oil side of sealing device 10 (axially inward relative to sealing device 10). In contrast, when a sealing device 10 has a gap 40 that is higher in volume than the critical value, the sealing device 10 will act to keep oil from leaking out of an engine oil side (axially inward relative to sealing device 10).

INDUSTRIAL APPLICABILITY

Effectiveness of a sealing device (such as sealing device 10) at keeping oil inside of an oil side of sealing device 10 is an aspect of the device's performance. It is desirable to have a seal that is effective, durable, and long-lasting. It is also desirable for a seal to effectively exclude contaminants from an oil side of sealing device 10. An excluder lip 28 made of a material such as Nomex that contacts a sleeve (such as sleeve 14) may serve to guard against intrusion of dust and/or other contaminants into an oil side of sealing device 10. However, such a configuration of excluder lip 28 may pose difficulties achieving the goal of keeping oil inside an oil side of sealing device 10. For example, movement of components of a sealing device (such as sealing device 10) may cause changes in volume of spaces (such as gap 40) inside of the device. Particularly relevant are spaces such as gap 40 between a main oil lip 24 and an excluder lip 28. Increases in volume can cause formation of a vacuum and can cause egress of oil from the oil side of sealing device 10.

So as to minimize the effects of volume change, the size of a space such as gap 40 should be appropriately sized. When a volume of gap 40 is set at an appropriate value, such as the values described above, the sealing device 10 will be effective at preventing oil from leaking past main oil lip 24 and keep the oil in the oil side of sealing device 10. Thus, an appropriate volume of a gap 40 may help ensure effective sealing of an engine. The disclosed embodiments do so to overcome the failures of the prior art, including of the embodiments described in PCT Publication No. WO 2018097268.

What is claimed is:
1. A sealing device comprising:
an annular first portion including:
    a flange that extends perpendicularly relative to a central axis of the first portion;
    an inner cylindrical portion having an engaging surface, wherein the engaging surface is configured to be fixedly connected to a rotatable shaft of a machine; and
    a protruding portion extending between the flange and the inner cylindrical portion; and
an annular second portion including:
    a rigid body component; and
    an elastic component having a main oil lip and an excluder lip, wherein the main oil lip is proximate to or in contact with the flange at a first location, and wherein the excluder lip contacts the inner cylindrical portion at a second location;
wherein a gap is defined by surfaces of the first portion and the elastic component between the first location and the second location, and wherein dimensions of the protruding portion are such that, when the sealing device is installed in a bore so that the engaging surface is fixedly connected to the shaft and the machine is operated so that the shaft rotates, the volume of the gap changes by not more than 10%.

2. The sealing device of claim 1, wherein the volume of the gap changes by not more than 9.75%.

3. The sealing device of claim 1, wherein the volume of the gap changes by not more than 9%.

4. The sealing device of claim 1, wherein the excluder lip comprises a material with a low permeability.

5. The sealing device of claim 1, wherein the protruding portion is located at a radially inner portion of the sealing device.

6. The sealing device of claim 1, wherein, when the engaging surface is fixedly attached to a rotatable shaft of a machine, the protruding portion extends axially inward toward an oil side of the sealing device.

7. The sealing device of claim 1, wherein the protruding portion forms an interior region having a rectangular cross-section.

8. A sealing device comprising:
an annular first portion including:
    a flange that extends perpendicularly relative to a central axis of the first portion;
    a protruding portion, wherein the protruding portion has an axially inner wall that extends perpendicularly relative to the central axis of the first portion; and
    a radially inner cylindrical portion having an engaging surface, wherein the engaging surface is configured to be fixedly connected to a rotatable shaft of a machine; and
an annular second portion including:
    a rigid body component, wherein the rigid body component has an axially outer wall that extends perpendicularly relative to a central axis of the second portion; and
    an elastic component having a main oil lip and an excluder lip, wherein the main oil lip is proximate to or in contact with the flange at a first location, and wherein the excluder lip contacts the inner cylindrical portion at a second location;
wherein the flange is one-third to one-half of the way between the protruding portion axially inner wall and the rigid body component axially outer wall, wherein the rigid body component axially outer wall is disposed axially outward of at least a portion of the excluder lip, relative to the protruding portion axially inner wall.

9. The sealing device of claim 8, wherein the protruding portion forms an interior region having a rectangular cross-section, and wherein the protruding portion further comprises two parallel walls.

10. The sealing device of claim 8, wherein the main oil lip is located in a central portion of the sealing device.

11. The sealing device of claim 8, wherein the protruding portion is located at a radially inner portion of the sealing device.

12. The sealing device of claim 8, wherein the rigid body component further comprises a radially outer wall, and wherein the axially inner wall of the rigid body component radially outer wall is approximately aligned with the protruding portion axially inner wall.

13. The sealing device of claim 8, wherein a gap is defined by surfaces of the first portion and the elastic component between the first location and the second location, and wherein dimensions of the protruding portion are such that, when the sealing device is installed in a bore of an engine so that the engaging surface is fixedly connected to the shaft and the engine is operated so that the shaft rotates, the volume of the gap changes by not more than 9.75%.

14. The sealing device of claim 8, wherein a gap is defined by surfaces of the first portion and the elastic component between the first location and the second location, and wherein dimensions of the protruding portion are such that, when the sealing device is installed in a bore of an engine so that the engaging surface is fixedly connected to the shaft and the engine is operated so that the shaft rotates, the volume of the gap changes by not more than 9%.

15. A sealing device comprising:
an annular first portion including:
a flange that extends perpendicularly relative to a central axis of the first portion;
an inner cylindrical portion having an engaging surface, wherein the engaging surface is configured to be fixedly connected to a rotatable shaft of a machine; and
a protruding portion, wherein the protruding portion has an axially inner wall that extends perpendicularly relative to the central axis of first portion and two parallel walls extending parallel to the central axis of the first portion; and
an annular second portion including:
a rigid body component; and
an elastic component having a main oil lip and an excluder lip, wherein the main oil lip is proximate to or in contact with the flange at a first location, and wherein the excluder lip contacts the inner cylindrical portion at a second location;
wherein dimensions of the protruding portion are sufficiently large so that, when the sealing device is installed in a bore so that the engaging surface is fixedly connected to the shaft and the machine is operated so that the shaft rotates, oil does not intrude into the sealing device past the main oil lip.

16. The sealing device of claim 15, wherein a cap is defined by surfaces of the first portion and the elastic component between the first location and the second location, and wherein dimensions of the protruding portion are such that, when the sealing device is installed in the bore so that the engaging surface is fixedly connected to the shaft and the machine is operated so that the shaft rotates, the volume of the gap changes by not more than 10%.

17. The sealing device of claim 15, wherein the protruding portion forms an interior region having a rectangular cross-section.

18. The sealing device of claim 15, wherein the excluder lip comprises a material with a low permeability.

19. The sealing device of claim 15, wherein the protruding portion is located at a radially inner portion of the sealing device.

20. The sealing device of claim 15, wherein, when the engaging surface is fixedly attached to a rotatable shaft of a machine, the protruding portion extends axially inward toward an oil side of the sealing device.

* * * * *